Figure 1:
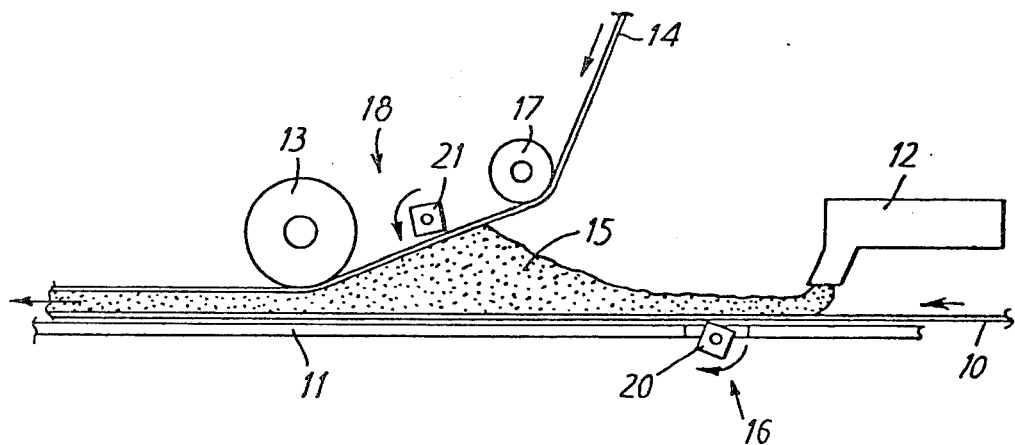

United States Patent [19]

Pilgrim

[11] Patent Number: 4,477,300

[45] Date of Patent: Oct. 16, 1984

[54] CEMENTITIOUS BOARD MANUFACTURE

[75] Inventor: Thomas A. Pilgrim, Edwalton, England

[73] Assignee: BPB Industries Public Limited Company, London, England

[21] Appl. No.: 488,677

[22] Filed: Apr. 26, 1983

[30] Foreign Application Priority Data

Apr. 30, 1982 [GB] United Kingdom ............... 8212648

[51] Int. Cl.$^3$ .................... B32B 31/12; B32B 31/16
[52] U.S. Cl. ........................ 156/44; 156/45;
156/73.6; 264/70; 264/344; 428/312.4; 428/703
[58] Field of Search .............. 156/73.6, 39, 42, 44,
156/45; 428/703, 312.4; 264/70, 344

[56] References Cited

U.S. PATENT DOCUMENTS

| 2,200,155 | 5/1940 | Camp et al. ............... 264/70 X |
| 2,537,509 | 1/1951 | Camp ..................... 156/73.6 X |
| 3,608,012 | 9/1971 | Jonell et al. ................ 264/70 |
| 3,836,354 | 9/1974 | Wienert ........................ 75/3 |
| 3,993,822 | 11/1976 | Knauf et al. ............... 428/213 |
| 4,159,361 | 6/1979 | Schupack .................. 428/240 |

Primary Examiner—Robert Dawson
Attorney, Agent, or Firm—Robert M. Didrick; Samuel Kurlandsky; Robert H. Robinson

[57] ABSTRACT

In the manufacture of cementitious board by depositing a slurry of hydraulic cementitious material, commonly gypsum plaster, between two facing sheets and forming it to the desired width and thickness prior to setting, the formation of voids in the core, due to air trapped in the slurry is avoided by vibrating the lower sheet (10) after the slurry (15) has been deposited on it, usually before the upper sheet (14) contacts the slurry, and subsequently vibrating the upper sheet when it comes into contact with the mass of cementitious slurry. The vibration of the lower sheet, for example by rotating polygonal shaft (20), causes bubbles of unwanted trapped air to rise through the slurry towards the upper surface and the accumulated bubbles are then broken by the vibration of the upper sheet, which may be accomplished by a second rotating shaft (21), before they become incorporated into the formed board as voids.

9 Claims, 2 Drawing Figures

CEMENTITIOUS BOARD MANUFACTURE

This invention relates to the manufacture of cementitious board in which a slurry of hydraulic cementitious material, commonly gypsum plaster, is deposited between two facing or 'lining' sheets, which may be of paper or other material, and formed to the desired width and thickness prior to setting. The process is normally carried out continuously and at a high linear speed.

A persistent problem in such manufacture has been the formation of voids in the core, due to air trapped in the slurry deposited on the lower of the two facing sheets. It is common practice to aerate the core of plasterboard, for example by the incorporation of fine foam into the plaster slurry, in order to provide a board of a desired core density. The present invention does not interfere with such procedures, but is intended to avoid larger accumulations of air, which otherwise form undesirably large voids in the core and if they appear at the interface, can leave unsupported areas of the facing sheet in the form of blisters.

The present invention offers a solution to this problem which is achieved by vibrating the lower sheet after the slurry has been deposited on it, usually before the upper sheet contacts the slurry, and subsequently vibrating the upper sheet when it comes into contact with the mass of cementitious slurry. The vibration of the lower sheet causes bubbles of unwanted trapped air to rise through the slurry towards the upper surface and the accumulated bubbles are then broken by the vibration of the upper sheet before they become incorporated into the formed board as voids, while the contained air escapes into the atmosphere.

Vibration can be applied mechanically by modifying existing board manufacturing lines to accommodate the necessary device of devices. These may be actuated by electrical, electromagnetic, fluid or other power, as desired. One convenient form of vibration device is a polygonal shaft rotated in contact with the face of each respective sheet opposite to that contacted by the slurry, or with a support (for example a conveyor belt) for such sheet. Other forms of vibration device, for example transducers of appropriate types can be used.

The frequency and amplitude of the vibration should be sufficient to achieve removal of air bubbles to the desired degree, but not so great as to cause damage to the facing sheets. The vibration devices are preferably controllable and adjustable for this purpose. Frequencies up to 140 Hz and amplitudes up to 5 mm are contemplated.

The invention is applicable not only to conventional paper-lined plaster or gypsum board, but also to board faced with inorganic fibre webs as described in Canadian Patent Application Serial No. 353 010 (see published GB-A-2 053 779), assigned to the assignee of the present invention.

Figure 2:
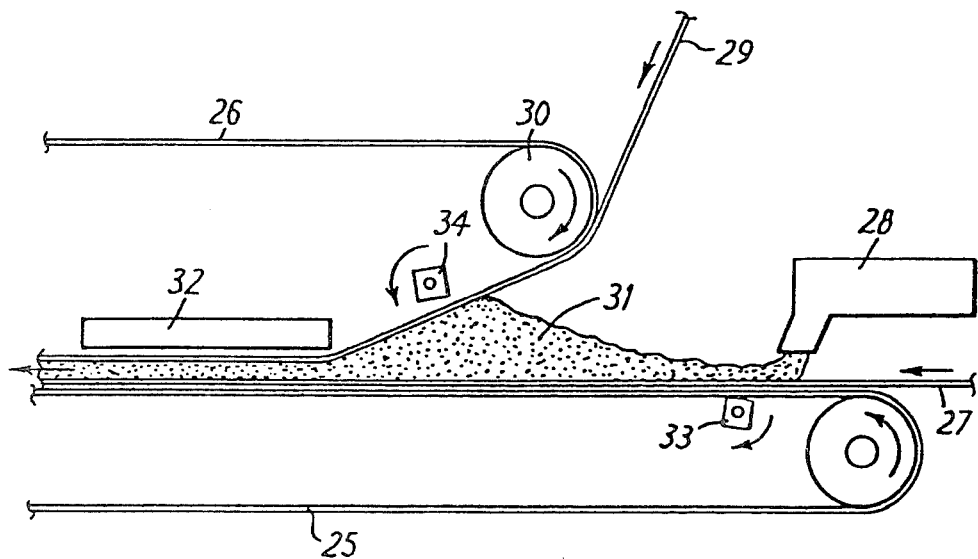

The invention will further be described, by way of example, with reference to the accompanying drawings in which:

FIG. 1 is a fragmentary diagrammatical longitudinal section of the board forming area of a squeeze roll plasterboard manufacturing plant modified in accordance with this invention; and FIG. 2 is a similar view of plant for the manufacture of board using glass tissue facing sheets, also modified in accordance with the invention.

In the plant shown in FIG. 1, a bottom facing sheet 10, for example of paper or paperboard, is drawn from a supply roll (not shown) along a forming table 11. A continuous mixer 12 deposits a slurry of gypsum plaster and water, containing conventional additives, on the upper face of the bottom sheet, which then carries it below a squeeze roll 13 where the top sheet 14, also for example of paper, is applied. The slurry builds up to form a "dam" 15 at the entrance to the nip between the squeeze roll and the table 11, where the slurry is squeezed between the papers to the desired thickness. At the same time the lateral edges of the bottom sheet 10 are folded up and over at the desired width, by edge guides (not shown) so that the top sheet 14 can be stuck down to the inturned edges of the bottom sheet. All these features are present in conventional plasterboard plant, in which the formed board is subsequently allowed to set, then cut and finally dried.

In modifying such plant for the purposes of this invention, a vibrator 16 is added in the table 11, beneath the bottom sheet 10, upstream of the dam 15. To accommodate the vibrator 16, the table 11 is interrupted at this point to provide a gap into which the vibrator extends to contact the lower face of the sheet 10. An additional guide roll 17 for the top sheet 14 is inserted before the squeeze roll 13 and in the convergent zone thus formed a second vibrator 18 is added, above the top sheet. This vibrator is positioned to vibrate the top sheet in the vicinity of the top of the slurry dam 15. The vibrators may conveniently be in the form of rotating polygonal shafts 20 and 21, for example of square section as shown, and may also be driven by electric motors or other drive (not shown), preferably at variable controlled speeds up to 2000 r.p.m. The shafts 20 and 21 are also preferably adjustably mounted in relation to the planes of the respective sheets so that the amplitude of the vibrations can be easily and controllably adjusted.

In operation, rotation of the vibrator shaft 20 under the initial layer of slurry brings the larger bubbles of air trapped in the slurry to the upper surface of the slurry. As the two papers and slurry move towards one another, advancing along the table 11, the bubbles are carried into the dam 15, where most of them are burst by vibration of the top sheet 14 under the action of the rotating shaft 21. Air from the burst bubbles excapes into the atmosphere above the dam 15. The board ultimately obtained is found to have a greatly reduced number of substantial voids in the core.

In FIG. 2, the application of the invention to the production of wallboard or panels in accordance with UK Specification No. 2 053 779 is illustrated. In the apparatus shown, the board is formed between a lower conveyor belt 25 and an upper conveyor belt 26. Resin-bonded non-woven glass fibre tissue 27 is supplied from a roll (not shown) to the upper run of the belt 25. Gypsum plaster slurry, containing any desired additives, is deposited by a mixer 28 on the upper surface of the bottom tissue as it is carried by the belt 25 into contact with a second sheet of glass fibre tissue 29, which enters beneath the upper belt 26 as it passes round a guide roller 30. A dam of slurry 31 is formed in the convergent zone between the upper and lower belts, until the upper belt passes beneath a forming plate 32 which determines the thickness of the board being formed. During subsequent passage of the tissues and slurry between the belts, as described in the application referred to, the latter are subjected to the action of opposed upper and lower mechanical vibrators acting on their respective faces opposite to those which contact the tissue and slurry. These vibrators cause the slurry to penetrate through the tissues and form the desired fine layer of gypsum of minimal thickness overlying the glass fibres at each face, as described in the aforementioned prior application. In this situation, however, no time elapses after vibration of the bottom of the assembly for bubbles to rise to the top before contacting the vibrating belt. It is not possible for unwanted air trapped in the slurry to escape from the slurry into the atmosphere, so that the formation of voids is not prevented by vibrators in these positions.

In adapting this plant for the purposes of the invention, a bottom vibrator 33 is disposed beneath the top run of the lower belt 25, to bring the trapped air to the surface, and an upper vibrator 34 is disposed behind the upper belt 26 above the slurry dam 31. Air bubbles are removed at the point where the dam contacts the upper tissue 29, and the released air escapes into the atmosphere above the dam.

In the embodiments of the invention described, the vibrators are rotating polygonal shafts so disposed that their corners contact the respective sheets or supporting belts to effect the necessary repeated displacement. Where such shafts are used, it is preferred that they should be rotated in a direction which causes the corners of the shaft to move against the sheets or belts in a direction contrary to the advance of the latter through the plant, as shown by the arrows in the drawings. It will be appreciated, however, that alternative forms of vibrator are also effective for the purposes of the invention, and concurrently filed Application Ser. No. 458,616 on the joint invention of the inventor hereof and John Robert Greaves describes one form of such alternative vibrator.

What is claimed is:

1. A process for the manufacture of cementitious board comprising the steps of: depositing a slurry of hydraulic cementitious material between two upper and lower facing sheets; causing air trapped in the slurry to rise as bubbles through the slurry by vibrating the lower sheet after the slurry has been deposited on it but before it comes into contact with the upper sheet; bursting the resulting bubbles at the upper surface of the slurry by vibration of the upper sheet when it comes into contact with the slurry; and forming the slurry between the sheets to the desired width and thickness before setting.

2. A process according to claim 1 in which vibration is applied by agitation of the face or faces of the respective sheet or sheets opposite to those which contact the slurry, or of a supporting structure for such sheets or sheets.

3. A process according to claim 1, in which the sheets are composed of glass fibre tissue and the process comprises the additional step of further vibrating the assembly of slurry and tissue and thereby causing the slurry to penetrate the tissue and form a thin film of cementitious material on the outer face thereof.

4. Apparatus for manufacturing cementitious board comprising: means for advancing a lower facing sheet; means for depositing hydraulic cementitious slurry on the upper surface of such sheet; means for applying an upper facing sheet to the upper surface of the slurry; first vibration means disposed beneath the lower sheet to vibrate the same at a location between the slurry deposition means and the zone where the upper sheet comes into contact with the slurry; second vibration means disposed above the upper sheet in the said zone to vibrate the second sheet; and means for forming the slurry between the two facing sheets to the desired width and thickness before setting.

5. Apparatus according to claim 4 in which the vibration means are provided with means for variably controlling the speed and amplitude of vibration.

6. Apparatus according to claim 4 for use in the manufacture of boards containing facing sheets of inorganic fibre web, additionally comprising further vibration means downstreams of the said vibration means at a location where they act upon the assembled sheets and slurry to cause the slurry to penetrate the web.

7. Apparatus according to claim 4 in which the vibration means are disposed behind moving belts that support the respective sheets.

8. Apparatus according to claim 4 in which the vibration means are located in gaps in solid supporting structures over which the respective sheets pass.

9. Apparatus according to claim 4 in which the vibration means comprise rotatable polygonal shafts.

* * * * *